US010266706B2

(12) United States Patent
Goodwin et al.

(10) Patent No.: US 10,266,706 B2
(45) Date of Patent: Apr. 23, 2019

(54) FIRE RETARDANT PAINT

(71) Applicant: Goodwin PLC, Stoke-on-Trent (GB)

(72) Inventors: Richard Stanley Goodwin, Stoke-on-Trent (GB); Andrew James Baylay, Stoke-on-Trent (GB); David James Stonier, Stoke-on-Trent (GB); John Peter Whitehurst, Stoke-on-Trent (GB)

(73) Assignee: Goodwin PLC, Stoke-on-Trent (GB)

( * ) Notice: Subject to any disclaimer, the term of this patent is extended or adjusted under 35 U.S.C. 154(b) by 687 days.

(21) Appl. No.: 14/413,208

(22) PCT Filed: Jul. 12, 2013

(86) PCT No.: PCT/GB2013/051864
§ 371 (c)(1),
(2) Date: Jan. 6, 2015

(87) PCT Pub. No.: WO2014/009748
PCT Pub. Date: Jan. 16, 2014

(65) Prior Publication Data
US 2015/0175815 A1    Jun. 25, 2015

(30) Foreign Application Priority Data
Jul. 13, 2012  (GB) .................... 1212530.8

(51) Int. Cl.
*C09D 5/18* (2006.01)
*C09D 1/00* (2006.01)

(52) U.S. Cl.
CPC .............. *C09D 5/18* (2013.01); *C09D 1/00* (2013.01)

(58) Field of Classification Search
None
See application file for complete search history.

(56) References Cited

U.S. PATENT DOCUMENTS

| 3,540,892 A | 11/1970 | Lard et al. |
| 5,034,160 A * | 7/1991 | Kindt ................... C04B 28/02 |
| | | 106/18.12 |

(Continued)

FOREIGN PATENT DOCUMENTS

| CN | 102167531 A | 8/2011 |
| EP | 0 212 930 A2 | 3/1987 |

(Continued)

OTHER PUBLICATIONS

Hillier et al, "On the mechanism of exfoliation of Vermiculite" (2013).*

(Continued)

*Primary Examiner* — Nathan T Leong
(74) *Attorney, Agent, or Firm* — Kilpatrick Townsend & Stockton LLP

(57) ABSTRACT

A spray paint with fire resistant and/or fire retardant properties comprises an aqueous suspension of fine expanded vermiculite particles wherein the vermiculite particles are from a mixture of chemically exfoliated vermiculite preferably about 75 to 99% by weight and thermally exfoliated vermiculite preferably about 1% to 25% by weight. The spray paint preferably has a viscosity as measured on a Brookfield test machine, number 6 bob at 20 rpm of 5,500 to 10,000 cps.

24 Claims, 1 Drawing Sheet

(56) References Cited

U.S. PATENT DOCUMENTS 6,090,315 A        7/2000  Bai
6,309,740 B1 *  10/2001  Shu ...................... C04B 14/208
                                                                        252/605

FOREIGN PATENT DOCUMENTS

| GB | 1 016 385    | 1/1966  |
|----|--------------|---------|
| GB | 2 193 953 A  | 2/1988  |
| GB | 2 325 496 A  | 11/1998 |
| WO | 99/37724 A1  | 7/1999  |
| WO | 99/43390 A1  | 9/1999  |
| WO | 03/051792 A2 | 6/2003  |

OTHER PUBLICATIONS

International Search Report and Written Opinion of the International Searching Authority corresponding to PCT/GB2013/051864 dated Oct. 14, 2013, 9 pages.

Search Report corresponding to Appl No. GB1212530.8 dated Nov. 12, 2012, 4 pages.

Miao, Zhao et al., "Preparation of Expanding Vermiculite by Chemical and Microwave Methods," *Advanced Materials Research* (2010) 96:155-160.

"Particle Size Distribution", Innopharma, downloaded from the internet on May 2, 2018, https://www.innopharmalabs.com/tech/applications-and-processes/particle-size-distribution, 3 pages.

* cited by examiner

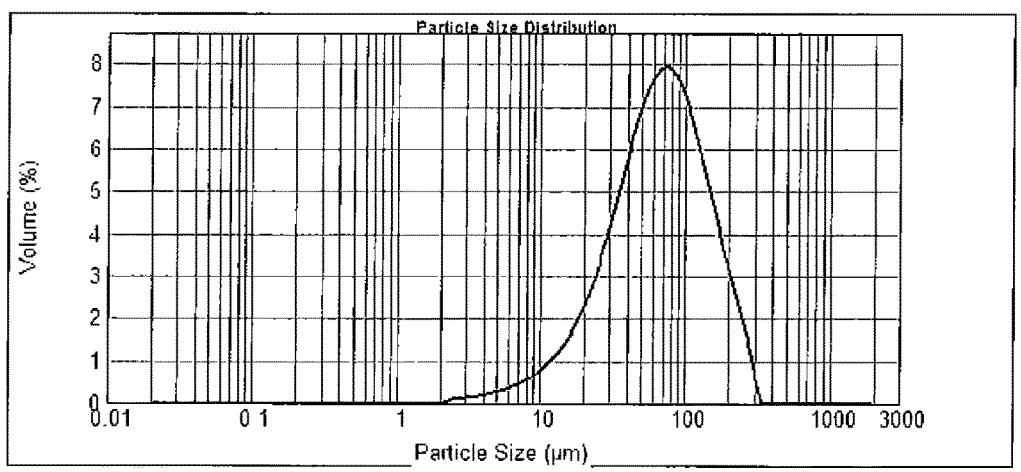

FIRE RETARDANT PAINT

The invention concerns a fire resistant or fire retardant paint that can be applied by spraying the paint onto a surface. The paint is a stable dispersed suspension of a mixture of chemically exfoliated vermiculite and thermally exfoliated vermiculite. The paint is capable of providing performance which significantly exceeds that required for Class "O" fire resistance according to BS476 Pt 6 & 7 or its equivalent Euro BSEN 11925 BSEN 13823 test.

The fire resistant paint may be applied to flammable surfaces in high risk areas such as below decks in ships or submarines or other high risk areas in buildings or other structures where the spread of fire would be catastrophic, for example as cruise liners, underground railway systems and airports The fire resistant paint may be applied during the construction process but may also be applied to existing surfaces to provide protection against fire for example in an existing commercial environment or in a heritage environment where the protection of carved wood is required.

It is possible to paint on top of the sprayed layers of the fire resistant paint with a colour paint for aesthetic reasons without damaging the performance of the dispersed vermiculite protective coating.

The invention relates to the use of an aqueous suspension of fine expanded vermiculite particles that have been formulated such that the suspension can be applied by spraying it onto a surface to vastly improve its fire protection. The suspension is preferably formulated such that it does not settle within the container in which it is supplied, such that its adhesion to the surface being coated is good and such that running on vertical surfaces is minimised.

The base material for the aqueous suspension of fire resistant paint is Vermiculite which is a naturally occurring mineral of chemical formula $(Mg,Fe,Al)_3(Al,Si)_4O_{10}(OH)_2 \cdot 4H_2O$. Vermiculite may be expanded by heat or chemical treatment to form exfoliated (expanded) vermiculite. This fire resistant paint may have a solids content of between 5% and 35% of exfoliated vermiculite more preferably between 15% and 25% of exfoliated vermiculite such as about 20%.

Exfoliated vermiculite particles may be suspended in a stable aqueous dispersion. Aqueous suspensions of expanded vermiculite have been used for fireproofing flexible materials such as paper and cloth. U.S. Pat. No. 6,309,740 identifies methods for manufacturing aqueous suspensions of expanded vermiculite and discloses the use of a spray coating of an aqueous suspension of chemically exfoliated vermiculite as a secondary layer to a primary cementitious fireproofing composition coating.

The present invention relates to the use of an aqueous suspension of fine expanded vermiculite as spray paint for surfaces of substrates that need to have their fire resistance enhanced. The vermiculite content in the suspension is preferably formulated for spray application and to minimise running when applied to vertical surfaces.

The vermiculite is preferably very fine with a particle size between one nanometer to 1000 micrometers and preferably not greater than 300 micrometers. The D90 particle size dispersion is preferably in the range 100 micrometers to 300 micrometers more preferably 140 micrometers to 250 micrometers especially 160 micrometers to 200 micrometers. The vermiculite solids content is a mixture of chemically exfoliated vermiculite and thermally exfoliated vermiculite. Preferably the chemical exfoliated vermiculite is between 75% and 99% by weight of the total vermiculite content more preferably between 88% and 96% such as 95% and the thermally exfoliated vermiculite content is between 25% and 1% by weight of the total vermiculite content more preferably between 12% and 4% such as 5%.

Suspensions of mixtures of chemically exfoliated and mechanically exfoliated vermiculite with viscosity in the range of 5,500 to 10,000 cps when measured on a Brookfield test machine, number 6 bob at 20 rpm are preferred for spray application as a fire resistant or fire retardant paint with good adhesion and non-run properties. Preferably the viscosity so measured is not less than 8,000, more preferably not less than 8,400 such as at least 8,500 cps. Preferably the viscosity is not more than 9,000 cps, preferably not more than 8,700 cps such as at most 8,600 cps.

While a suitable aqueous suspension of vermiculite with no additional additives provides a fire resistant paint the suspension may additionally include other additives such as anti settling and flocculating agents conventionally used in spray paints in order to enhance performance provided that they do not interfere with the ability of the vermiculite to remain in suspension over an extended period or damage its fire resistant characteristics. Preferably the vermiculite will remain in suspension if left undisturbed for a period of at least 6 months at room temperature such as at between 5 to 35 degrees centigrade, for example at 20 degrees centigrade, more preferably at least 12 months especially 24 months or more.

Conventional fire resistant paints rely on the presence of an inert compound that creates a barrier to the flammable surface that they are applied to and on the fact that they do not easily break away from the surface they are applied to whilst being exposed to heat and fire.

The aqueous dispersed vermiculite spray paint achieves its fire resistant and fire retardant properties in four ways:

(1) The dried aqueous vermiculite dispersion insulates the surface it has been applied to thereby preventing it from reaching its self ignition temperature when it is exposed to heat.

(2) The dried aqueous vermiculite dispersion provides an oxygen resistant barrier such that the flammable materiel that has been coated with the fire resistant paint does not combust even if it does reach ignition temperature as it is starved of oxygen.

(3) The dried aqueous vermiculite dispersion is inert and will withstand temperatures as high as 1,200 degrees Centigrade with no degradation. Even at 1,350 degrees Centigrade it will not combust but only self frits and such frit still provides a barrier to fire penetration and also continues to insulate although to a lesser extent.

(4) During the fritting process mentioned in (3) above, the vermiculite has a propensity to self heal any opening in its surface such that a barrier for oxygen penetration is maintained, this is by nature of the platelet structure of the vermiculite particles that joint together as can be seen under an electron microscope in the cold condition.

The invention will be more clearly understood from the following description and FIGURES given by example only in which:

FIG. 1 is an illustrative size distribution chart for Vermiculite Dispersion DM651 developed by Dupré Minerals Limited.

DM651 was developed by Dupré Minerals Limited for the purposes of spray application with a mixture of chemically expanded vermiculite and thermally expanded vermiculite in the ratio 95% to 5% in controlled particle size ranges and with these solids constituting 20% by weight of an aqueous solution. The vermiculite is capable of being retained in suspension in such dispersions for extended periods such as for months or a year or two years or more. DM651 from Dupré Minerals Limited has a size distribution for illustrative purposes set out in FIG. 1. The particles range from nanometer sizes to 1000 micrometers with the majority of the vermiculite being around 300 micrometers in size. For purposes of spraying the fire resistant paint medium the particle size distribution should be such that the vermiculite may be maintained in suspension over an extended period, will provide a suitable spray when administered from conventional spray equipment be it airless or with air, will maintain a good coating ability when sprayed and will provide a good thermal insulation and form oxygen barrier properties when sprayed.

Vermiculite particle sizes in a range of up to 2000 micrometers preferably less than 1000 micrometers and more preferably 300 micrometers or less are suitable for this purpose. Preferably at least 90% by weight and more preferably 95% by weight of the vermiculite particles should be no larger than 300 micrometers and more preferably between 300 and less than 1 micrometer. In preferred embodiments the vermiculite particles have a D90 of between 50 micrometers and 300 micrometers, preferably between 100 micrometers and 250 micrometers, more preferably between 150 micrometers and 200 micrometers. Vermiculite may be present in a suitable suspension at between 1% and 40% by weight, preferably 10 to 30% and more preferably 15% to 25% especially about 20%.

While an aqueous suspension of vermiculite with no additional additives and especially a suspension in deionised or distilled water provides an excellent non-toxic spray medium the suspension may additionally include other additives such as anti-settling agents and flocculating agents conventionally used in spray paint systems to enhance performance and additives to enhance the stability of the suspension. The additives should preferably not adversely interfere with the ability of the vermiculite to remain in suspension over an extended period and preferably should not interfere with the ability of the suspension when sprayed to form a protective fire resistant inert and thermal insulating coating.

The following examples illustrate the benefits of vermiculite suspension as a fire barrier material capable of being sprayed.

EXAMPLE 1—WARRINGTON BLUE BOARD TEST

Blue Board BS 476 Part 6 and 7 fire test at Exova Warrington.
Preparation Method
Blue Boards are sprayed using Industrial Airless Spray Gun, 429 nozzles, with 3 passes of the spray gun using DM651 vermiculite dispersion. Samples are then dried in ambient temperature until weight loss stops before testing
Testing—BS 476 Part 6
In the Part 6 tests the blue board samples are placed into a frame and bolted into the fully enclosed test rig. Flame is applied to the test piece via a burner bar at the bottom of the rig to ignite the test sample before a radiant heater is turned on.

As the test piece flames, the temperature increase is measured at set intervals and recorded. A calibration temperature is deducted from the measured specimen temperature, and the result multiplied by 10 to create an index value. To pass the Part 6 test these values when added after 3 minutes must not exceed 6 and when totalled after 20 minutes must not exceed 12.

Testing—BS 476 Part 7
The coated blue board is suspended in a metal frame held at right angles to a large radiant heater. For the first minute and a half a gas flame is applied to the bottom left hand corner of the test piece in an attempt to light it via a gas burner tube at the bottom left corner of the test piece. The radiant heater is turned on and the distance the flame travels after 10 minutes duration is recorded.

At the end of the 10 minute test the Board coated with Dupré DM651 had not ignited and the coating was perfectly intact. The coating had zero flame propagation length as the subsurface flammable coating had not ignited. To pass level 1 the flame length propagation from the edge nearest the gas radiant heater must not exceed 165 mm. It also passed level "O" which relates to part 6 which measures heat output and as the board did not ignite it comfortably passed the heat output test criteria.

Results
There was no flame and therefore no flame spread to measure. All three sample boards passed the Part 6 and 7 trial with ease giving a performance which passes UK class 1 and class 0. Furthermore there appears to be no advantage in adding extra coats as a 3 coat test piece was sufficient to give full protection.

EXAMPLE 2

The 95% chemically and 5% mechanically exfoliated 20% by weight solids finely divided vermiculite dispersion Dupré DM651 was applied to a wooden board in a vertical orientation by spraying using Industrial Airless Spray Gun, 429 nozzles. The result was excellent adhesion with little to no tendency to run. The sprayed material dried to form a regular and intact coating.

By contrast during extensive testing it was found that 100% chemically exfoliated suspensions could not be identified which provided both a non-clogging spray and non-run or non-drip coverage. A suspension substantially identical to Dupré DM651 but containing 100% chemically exfoliated vermiculite did not adhere to the board when applied by spraying. A suspension containing 100% chemically exfoliated vermiculite containing a higher percentage by weight solids would adhere to the board, but at this higher concentration of vermiculite was not capable of being sprayed without immediate clogging of the sprayer. The use of a mixture of chemically and mechanically exfoliated vermiculite therefore permits the production of a suspension which can successfully be applied by spraying to a substrate and which adheres without running on a vertical or inclined or irregularly formed surface.

The viscosity of the Dupré DM651 suspension as measured on a Brookfield test machine, number 6 bob at 20 rpm was 8600 cps. This may be contrasted with Dupré DM338S a comparable suspension of chemically exfoliated vermiculite with a similar particle size profile with a viscosity determined on the same basis of 1,560 cps. Suspensions of mixtures of chemically exfoliated and mechanically exfoliated vermiculite with viscosity as measured on a Brookfield test machine, number 6 bob at 20 rpm in the range of 5,500 to 10,000 cps are preferred for spray application as a fire resistant or fire retardant paint with good adhesion and non-run properties. Preferably the viscosity of the paint as measured on a Brookfield test machine number 6 bob at 20 rpm is not less than 8,000, more preferably not less than 8,400 such as at least 8,500. Preferably the viscosity as measured on a Brookfield test machine number 6 bob at 20 rpm is not more than 9,000 cps, preferably not more than 8,700 cps such as at most 8,600 cps.

The invention claimed is:

1. A spray paint with fire resistant and/or fire retardant properties comprising an aqueous suspension of expanded vermiculite particles having a particle size between one nanometer to 1000 micrometers, wherein the vermiculite particles are from a mixture of chemically exfoliated vermiculite and thermally exfoliated vermiculite, wherein the chemically exfoliated vermiculite is between 75% and 99% by weight of the total vermiculite content and the thermally exfoliated vermiculite content is between 25% and 1% by weight of the total vermiculite content.

2. A spray paint according to claim 1 wherein the chemically exfoliated vermiculite is between 88% and 96% weight of the total vermiculite content and the thermally exfoliated vermiculite content is between 12% and 4% by weight of the total vermiculite content.

3. A spray paint according to claim 1 wherein the chemically exfoliated vermiculite is about 95% by weight of the total vermiculite content and the thermally exfoliated vermiculite content is about 5% by weight of the total vermiculite content.

4. A spray paint according to claim 1 wherein said vermiculite suspension comprises expanded vermiculite with a maximum particle size of 300 micrometers or less.

5. A spray paint according to claim 1 wherein said vermiculite particles have a D90 of between 50 micrometers and 300 micrometers.

6. A spray paint according to claim 1 wherein said vermiculite particles have a D90 of between 100 micrometers and 250 micrometers.

7. A spray paint according to claim 1 wherein said vermiculite particles have a D90 of between 150 micrometers and 200 micrometers.

8. A spray paint according to claim 1 wherein said vermiculite suspension comprises vermiculite at between about 3% and about 40% by weight.

9. A spray paint according to claim 1 wherein said vermiculite suspension comprises vermiculite at between about 10% and about 30% by weight.

10. A spray paint according to claim 1 wherein said vermiculite suspension comprises vermiculite at between about 15% and about 25% by weight.

11. A spray paint according to claim 1 wherein said vermiculite suspension comprises vermiculite at about 20% by weight.

12. A spray paint according to claim 1 having a viscosity in the range of from 5,500 to 10,000 cps.

13. A spray paint according to claim 1 having a viscosity in the range of from 8,000 to 9,000 cps.

14. A spray paint according to claim 1 having a viscosity in the range of from 8,400 to 8,700 cps.

15. A spray paint according to claim 1 having a viscosity in the range of from 8,500 to 8,600 cps.

16. A spray paint according to claim 1 which remains stable in storage with the vermiculite remaining in suspension for a period of at least 6 months.

17. A spray paint according to claim 1 which remains stable in storage with the vermiculite remaining in suspension for a period of at least 12 months.

18. A spray paint according to claim 1 which remains stable in storage with the vermiculite remaining in suspension for a period of at 24 months.

19. A method of providing fire resistance or fire retardant properties to a substrate comprising spraying the substrate with a spray paint according to claim 1.

20. A method according to claim 19 wherein the substrate is wood.

21. A method according to claim 19 wherein the spray paint is not applied as a secondary layer to a primary cementitious fireproofing composition coating.

22. A method according to claim 19 wherein said spray paint is applied directly to said substrate in one or more coatings.

23. A method according claim 19 wherein a colour coating or decorative layer is applied over said spray paint.

24. A substrate coated with one or more coatings of a spray paint according to claim 1.

* * * * *